United States Patent
Kim et al.

(10) Patent No.: US 12,540,210 B2
(45) Date of Patent: Feb. 3, 2026

(54) ALKOXYLATED RESOL-TYPE PHENOL RESIN AND METHOD FOR PRODUCING SAME

(71) Applicant: KOLON INDUSTRIES, INC., Seoul (KR)

(72) Inventors: Yu Sung Kim, Seoul (KR); Jeong Eun Yu, Seoul (KR); Sang Youb Seong, Seoul (KR); Jong Un Sung, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 819 days.

(21) Appl. No.: 17/781,211

(22) PCT Filed: Mar. 5, 2021

(86) PCT No.: PCT/KR2021/002752
§ 371 (c)(1),
(2) Date: May 31, 2022

(87) PCT Pub. No.: WO2021/177780
PCT Pub. Date: Sep. 10, 2021

(65) Prior Publication Data
US 2023/0017275 A1    Jan. 19, 2023

(30) Foreign Application Priority Data

Mar. 6, 2020  (KR) .................. 10-2020-0028398
Mar. 5, 2021  (KR) .................. 10-2021-0029382

(51) Int. Cl.
C08G 8/22    (2006.01)
B65D 23/02   (2006.01)
C09D 161/12  (2006.01)

(52) U.S. Cl.
CPC .............. *C08G 8/22* (2013.01); *C09D 161/12* (2013.01); *B65D 23/02* (2013.01)

(58) Field of Classification Search
CPC .......... C08G 8/22; C09D 161/12; B65D 23/02
USPC ......................................... 528/165
See application file for complete search history.

(56) References Cited

U.S. PATENT DOCUMENTS

| | | |
|---|---|---|
| 4,122,054 A | 10/1978 | Culbertson |
| 4,157,324 A | 6/1979 | Culbertson |
| 9,012,122 B2 | 4/2015 | Hirano |
| 2017/0029550 A1 | 2/2017 | Kage |

FOREIGN PATENT DOCUMENTS

| | | |
|---|---|---|
| CN | 110606925 A | 12/2019 |
| EP | 3130619 A1 | 2/2017 |
| JP | 56129263 A | 10/1981 |
| JP | 04236278 A | 8/1992 |
| JP | 07207222 A | 8/1995 |
| JP | 2000336304 A | 12/2000 |
| JP | 2001311039 A | 11/2001 |
| JP | 2002-275229 A | 9/2002 |
| JP | 2003-82046 A | 3/2003 |
| KR | 10-2016-0147251 A | 12/2016 |
| TW | 201331270 A | 8/2013 |

OTHER PUBLICATIONS

TW office Action dated Sep. 23, 2022.
European Search Report dated Jul. 20, 2023.
Notification of Reasons for Refusal dared Jul. 18, 2023.
International Search Report dated Jun. 17, 2021.

*Primary Examiner* — David T Karst
(74) *Attorney, Agent, or Firm* — Harvest IP Law, LLP

(57) ABSTRACT

The present invention is related to a method of preparing an alkoxylated resol-type phenol resin and an alkoxylated resol-type phenol resin. An alkoxylated resol-type phenol resin prepared using the method is capable of obtaining a coating film having excellent corrosion resistance, salt resistance, and color characteristics may be prepared, and a composition including the alkoxylated resol-type phenol resin as a curing agent may be suitably used as an vanish for coating the interior of beverage cans.

6 Claims, No Drawings

ALKOXYLATED RESOL-TYPE PHENOL RESIN AND METHOD FOR PRODUCING SAME

CROSS REFERENCE TO RELATED APPLICATIONS

This application is a National Stage of International Application No. PCT/KR2021/002752 filed Mar. 5, 2021, claiming priority based on Korean Patent Application No. 10-2020-0028398 filed Mar. 6, 2020 and Korean Patent Application No. 10-2021-0029382 filed Mar. 5, 2021, the disclosure of which is incorporated herein by reference in its entirety.

TECHNICAL FIELD

The present invention relates to an alkoxylated resol-type phenol resin and a method of preparing the same.

BACKGROUND ART

The inner surfaces of beverage cans and food cans are coated with a coating film that reduces the corrosion of cans being caused by the beverage or food contained therein. Since the coating film is commonly deposited on a metal prior to the production of cans, the coating film is required to have processability good enough to prevent detachment of the coating film from cans during the production of cans and at the same time to have excellent corrosion resistance and salt resistance after the production.

A known example of varnish for forming the coating film is a varnish that includes a bisphenol-A-type epoxy resin that serves as a main material and a phenol resin that serves as a curing agent. The varnish including a bisphenol-A-type epoxy resin has high processability, high hydrothermal resistance, and high adhesion to metals.

However, the bisphenol-A-type epoxy resin may include bisphenol A, which is considered to function as endocrine disruptor and carry a risk of adversely affecting the brain of living organisms, as an unreacted material in the production of the bisphenol-A-type epoxy resin. In addition, bisphenol A may elute from a coating film formed of a varnish that includes the bisphenol-A-type epoxy resin when the coating film is cleaned with a detergent or brought into contact with an acidic liquid or a hot liquid. Therefore, there is a need of the varnish for coating cans that do not include the bisphenol-A-type epoxy resin.

Examples of resin used as an alternative to the bisphenol-A-type epoxy resin include an acrylic resin including a hydroxyl group, an alkyd resin including a hydroxyl group, and a polyester resin including a hydroxyl group. Also, in the case of a curing agent, active development of technologies using alkyl phenols including cresol, para-tert-butyl phenol, and para-tert-octyl phenol as a bisphenol-free phenol curing agent applicable to epoxy resins and polyester resins as a raw material is in progress.

Performance of the coating material is greatly influenced by properties of a curing agent (a phenol resin) that is mixed with the coating material. Most of conventional methods for preparing a bisphenol-free phenol curing agent include meta-cresol as a raw material. This is because when meta-cresol, which is more reactive than other raw materials, is used, a phenol resin having excellent processability and metal adhesion may be easily manufactured. The phenol resin prepared using the meta-cresol described above as a raw material is used as a curing agent of a varnish for coating the inner surface of cans and thus has excellent processability and metal adhesion. However, improved corrosion resistance and salt resistance of coating films which are essentially required according to long-term accommodation of beverages or foods are still needed.

PRIOR ART DOCUMENTS

Japanese Patent Application Publication No. 2000-336304

DESCRIPTION OF EMBODIMENTS

Technical Problem

It is an object of the present invention to provide an alkoxylated resol-type phenol resin and a method of preparing the same, wherein a coating film having excellent corrosion resistance, salt resistance, and color characteristics may be obtained when the alkoxylated resol-type phenol resin is used. Also, it is still another object of the present invention to provide a resin composition including the alkoxylated resol-type phenol resin and a varnish for coating the inner surface of cans, the varnish including the resin composition.

Solution to Problem

According to an aspect of the present invention, provided is a method of preparing an alkoxylated resol-type phenol resin, the method including (a) reacting a phenolic compounds, which is a mixture of phenol and para-alkyl phenols, and an aldehyde compound in the presence of a basic compound to obtain a resol-type phenol resin; and (b) reacting the resol-type phenol resin an alcoholic compounds to prepare an alkoxylated resol-type phenol resin.

According to another aspect of the present invention, provided is an alkoxylated resol-type phenol resin including a repeating unit represented by Formula 1 and a repeating unit represented by Formula 2 and at least one group represented by Formula 3.

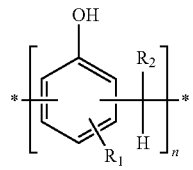

[Formula 1]

In Formula 1, n is an integer of 1 to 10, $R_1$ is hydrogen or a group represented by Formula 3, and $R_2$ is hydrogen or a C1 to C2 alkyl group.

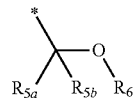

[Formula 3]

In Formula 3, $R_{5a}$ and $R_{5b}$ are each independently hydrogen or a C1 to C2 alkyl group, and $R_6$ is hydrogen or a C1 to C20 alkyl group.

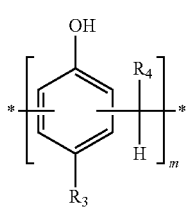

[Formula 2]

In Formula 2, m is an integer selected from 1 to 10, $R_3$ is a C1 to C8 alkyl group, and $R_4$ is hydrogen or a C1 to C2 alkyl group.

According to another aspect of the present invention, provided is a resin composition including the alkoxylated resol-type phenol resin.

According to another aspect of the present invention, provided is a varnish including the resin composition.

Advantageous Effects of Disclosure

A method of preparing an alkoxylated resol-type phenol resin according to the present invention enables preparation of an alkoxylated resol-type phenol resin, which is a curing agent with which a coating film having excellent corrosion resistance, salt resistance, and color characteristics may be formed, and a composition including the alkoxylated resol-type phenol resin as a curing agent may be suitably used as a varnish, which is, for example, a coating material for forming a corrosion resistant coating layer.

DETAILED DESCRIPTION

Hereinafter, several aspects and various embodiments of the present invention will now be described in detail.

The terms or language used herein should not be interpreted as limited as typical ones or ones defined in the dictionary but rather to comply with the technical spirit of the present disclosure based on the doctrine that the inventor may define terms on his own in a proper manner so as to make the invention understood in a best way to describe best the invention.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in the present invention, specify the presence of stated features, integers, steps, operations, elements, components, or combinations thereof but do not preclude the presence or addition of one or more other features, integers, steps, operations, elements, components, or combinations thereof.

In particular, according to one aspect of the present invention, provided is a method of preparing an alkoxylated resol-type phenol resin, the method including (a) reacting a phenolic compounds, which is a mixture of phenol and para-alkyl phenols, and an aldehyde compound in the presence of a basic compound to obtain a resol-type phenol resin; and (b) reacting the resol-type phenol resin an alcoholic compounds to prepare an alkoxylated resol-type phenol resin.

Examples of the para-alkylphenol may include a compound having a structure, in which a C1 to C8 alkyl group is substituted to carbon atom in the number 4 position of a benzene moiety of phenol.

For example, the para-alkyl phenols may include para-cresol, para-ethylphenol, para-propylphenol, para-isopropylphenol, para-n-butylphenol, para-sec-butylphenol, para-tert-butylphenol, para-isobutylphenol, para-n-pentylphenol, para-tert-pentylphenol, para-neopentylphenol, para-isopentylphenol, para-sec-pentylphenol, para-3-pentylphenol, para-sec-isopentylphenol, para-n-hexylphenol, para-isohexylphenol, para-sec-hexylphenol, para-tert-hexylphenol, para-n-heptylphenol, para-isoheptylphenol, para-sec-heptylphenol, para-tert-heptylphenol, para-n-octylphenol, para-isooctylphenol, para-sec-octylphenol, para-tert-octylphenol, or a mixture of at least two selected therefrom.

According to an embodiment, the para-alkyl phenols may be at least one selected from the group consisting of para-cresol, para-tert-butylphenol, para-ethylphenol, and para-tert-octylphenol.

According to another embodiment, the para-alkyl phenols may be at least one selected from the group consisting of para-cresol, para-tert-butylphenol, and para-tert-octylphenol. For example, the para-alkyl phenols may be para-cresol.

Conventional methods include meta-cresol as an essential raw material in preparing a resol-type phenol resin, because the meta-cresol has an excellent reactivity so that a resol-type phenol resin may be easily manufactured. In the present invention, an alkoxylated resol-type phenol resin was prepared successfully using a phenol and a para-alkyl phenols as raw materials without using meta-cresol as a raw material, and more specifically, it was confirmed that a alkoxylated resol-type phenol resin prepared using a phenol and para-alkyl phenolss for example, para-cresol as raw materials exhibits excellent corrosion resistance and salt resistance as compared with those of a conventional alkoxylated resol-type phenol resin prepared using a phenol and meta-cresol as raw materials, thereby completing the present invention.

In the step (a), the phenol and the para-alkyl phenols may be reacted in a molar ratio in a range of 1:1 to 1:10. For example, the phenol and the para-alkyl phenols may be reacted in a molar ratio in a range of 1:2 to 1:6 or in a molar ratio in a range of 1:2 to 1:5. When the molar ratio of the phenol and the para-alkyl phenols is beyond a range of 1:1 to 1:10, the compatibility to an alcoholic compounds may be insufficient. When the molar ratio of the phenol and the para-alkyl phenols is higher than this range, a degree of alkoxylation may decrease as a molecular weight increases, and thus corrosion resistance and salt resistance may be insufficient, which is not preferable.

The aldehyde compound may include at least one selected from the group consisting of paraformaldehyde, formaldehyde, and glyoxal. For example, the aldehyde compound may be paraformaldehyde.

In the step (a), the phenolic compounds and the aldehyde compound may be reacted in a molar ratio in a range of 1:1 to 1:10. For example, the phenolic compounds and the aldehyde compound may be reacted in a molar ratio in a range of 1:1 to 1:5 or in a molar ratio in a range of 1:3 to 1:5. When the molar ratio of the phenolic compounds and the aldehyde compound is beyond the range of 1:1 to 1:10, the reaction may not be performed smoothly, which may result in significant decrease in the yield of the final product or may not form the desired molecular structure in the present invention, and thus it is not preferable. Also, when the molar ratio of the phenolic compounds and the aldehyde compound is beyond the range of 1:3 to 1:5, an alkoxy reaction, which is a subsequent process, may not be performed smoothly due to differences in structures of the produced molecules, and accordingly corrosion resistance, salt resistance, and processability may be deteriorated.

In the step (a), examples of the basic compound may include a metal ion catalyst, a non-metal ion catalyst, or a mixture of the metal ion catalyst and the non-metal ion catalyst. The metal ion catalyst may be NaOH, KOH, $Mg(OH)_2$, $Ba(OH)_2$, or $Ca(OH)_2$, and the non-metal ion catalyst may be $NH_4OH$, $N(CH_2CH_2OH)_3$, or $N(CH_2CH_3)_3$.

According to an embodiment, the basic compound may include at least one compound selected from the group consisting of NaOH, KOH, $Mg(OH)_2$, $Ba(OH)_2$, $Ca(OH)_2$, $NH_4OH$, $N(CH_2CH_2OH)_3$, and $N(CH_2CH_3)_3$.

For example, the basic compound may include at least one compound selected from the group consisting of NaOH, $Ba(OH)_2$, $Ca(OH)_2$, $Mg(OH)_2$, and KOH.

In the step (a), the reaction may be performed while maintaining a temperature of 50° C. to 70° C. for 2 to 5 hours and then maintaining a temperature of 75° C. to 90° C. for 5 to 10 hours, the basic compound may be NaOH, and the basic compound may be added from 0.03 mol to 0.3 mol based on 1 mol of the phenolic compounds.

According to an embodiment, in the step (a), the reaction may be performed while maintaining a temperature of 55° C. to 65° C. for 2 to 4 hours and then maintaining a temperature of 75° C. to 85° C. for 7 to 9 hours, the basic compound may be NaOH, and the basic compound may be added from 0.05 mol to 0.2 mol based on 1 mol of the phenolic compounds.

When the temperature ranges, time ranges, types and amounts of the basic compound in the step(a) are not satisfied, a resol-type phenol resin having the desired properties, for example, excellent corrosion resistance, salt resistance, and processability may not be obtained from a phenolic compounds including a phenol and a para-alkyl phenols.

In the step (b), the alcoholic compounds, in which methylol groups of the resol-type phenol resin are used in substitution into alkoxy groups, may be at least one selected from the group consisting of n-butanol, isobutylalcohol, and n-amyl alcohol.

For example, the alcoholic compounds may be n-butanol.

An amount of the alcoholic compounds may be in a range of 100 parts to 500 parts by weight based on 100 parts by weight of the resol-type phenol resin prepared in the step (a).

For example, the amount of the alcoholic compounds may be in a range of 200 parts to 400 parts by weight in consideration of reactivity between the resol-type phenol resin and the alcoholic compounds.

According to an embodiment, the para-alkyl phenols may be para-cresol, the aldehyde compound may be paraformaldehyde, the basic compound may be NaOH, and the alcoholic compounds may be n-butanol. Unlike conditions of other types of compounds, there was an advantage of using each of these types of compounds that a degree of butoxy group substitution of methylol groups was easily controlled, and it was confirmed that the alkoxylated resol-type phenol resin prepared using the compounds exhibited excellent processability, corrosion resistance, and salt resistance.

In the step (b), the reaction may be performed at a temperature of 90° C. to 150° C. for 10 to 36 hours. For example, the reaction may be performed at a temperature of 100° C. to 110° C. for 16 to 24 hours.

50% to 100% of methylol groups of the resol-type phenol resin may be substituted with alkoxy groups. For example, 60% to 100%, 60% to 90%, or 70% to 90% of methylol groups of the resol-type phenol resin may be substituted with alkoxy groups. Here, proportions of the methylol groups being substituted into alkoxy groups are calculated based on a weight of the methylol groups. When the reaction of the step (b) is beyond a temperature range of 90° C. to 150° C. and a time range of 10 hours to 36 hours, less than 50% of methylol groups of the resol-type phenol resin are substituted with alkoxy groups, and thus a tendency of graft polymerization of the prepared alkoxylated resol-type phenol resin alone may increase, which may have a problem of decrease in processability.

According to an embodiment, since 50% to 100% of methylol groups of the resol-type phenol resin may be substituted with alkoxy groups, compatibility with the main materials is improved by the substitution in this range, and thus a coating film having excellent corrosion resistance and salt resistance may be formed.

The step (b) may be performed by controlling the pH to 3.0 to 4.5 in the presence of at least one acidic compound selected from the group consisting of formic acid, sulfuric acid, and phosphoric acid. For example, the step (b) may be performed with controlling the pH to 3.5 to 4.0 in the presence of formic acid.

A weight average molecular weight of the alkoxylated resol-type phenol resin may be in a range of 1000 g/mol to 3000 g/mol. For example, a weight average molecular weight of the alkoxylated resol-type phenol resin may be in a range of 1200 g/mol to 2500 g/mol or 1500 g/mol to 2000 g/mol. When the weight average molecular weight of the alkoxylated resol-type phenol resin is within these ranges, the alkoxylated resol-type phenol resin may have excellent processability, excellent compatibility with the main materials that are combined to form a coating film, and excellent curing property.

Although not explicitly described in the following Examples and Comparative Examples, in the method of preparing an alkoxylated resol-type phenol resin according to the present invention, characteristics of each of alkoxylated resol-type phenol resins prepared by varying a type of the para-alkyl phenols, a type of the aldehyde compound, a molar ratio of the phenol and para-alkyl phenols, a molar ratio of the phenolic compounds and the aldehyde compound, a reaction temperature and time in the step (a), a type of the basic compound, an added amount of the basic compound, a reaction temperature and time in the step (b), a degree of substitution of alkoxy groups of the resol-type phenol resin, a pH of the step (b), and a weight average molecular weight of the alkoxylated resol-type phenol resin were analyzed, and this was used to form a coating film on an aluminum metal using the alkoxylated resol-type phenol resins to carry out the performance analysis.

As a result, unlike other conditions and other numerical value ranges, it was confirmed that when all the following conditions were met, compatibility of the alkoxylated resol-type phenol resin with the main materials was improved, and thus there was an effect of forming a coating film having excellent corrosion resistance and salt resistance. In addition, it was confirmed that when the alkoxylated resol-type phenol resin was applied in a coating film for coating the inner surface of cans, excellent color characteristics were exhibited such as easy realization of the desired color, maintaining the initial color after a long-term storage of the content, and no blushing phenomenon.

① The para-alkyl phenols is para-cresol, ② the aldehyde compound is paraformaldehyde, ③ the phenol and para-alkyl phenols in the step (a) are reacted in a molar ratio of 1:2 to 1:5, ④ the phenolic compounds and the aldehyde compound in the step (a) are reacted in a molar ratio of 1:3 to 1:5, ⑤ the step (a) is performed by maintaining a temperature of 50° C. to 70° C. for 2 to 4 hours and then maintaining a temperature of 75° C. to 90° C. for 7 to 9 hours, ⑥ the basic compound is NaOH, ⑦ an added amount of the basic compound is in a range of 0.05 mol to 0.2 mol based on 1 mol of the phenolic compounds, ⑧ the step (b) is performed at a temperature of 100° C. to 110° C. for 16 hours to 24 hours, ⑨ the alcoholic compounds is n-butanol, ⑩ 80% to 90% of methylol groups of the resol-type phenol resin are substituted with alkoxy groups, ⑪ the step (b) is performed by controlling the pH to 3.5 to 4.0 in the presence of formic acid, ⑫ a weight average molecular weight of the alkoxylated resol-type phenol resin is in a range of 1000 g/mol to 3000 g/mol.

When at least one of these conditions was not satisfied, it was confirmed that there was a problem of a decrease in processability of the alkoxylated resol-type phenol resin due to an increase in a tendency of graft polymerization of the alkoxylated resol-type phenol resin alone, and it was also confirmed that color characteristics of the alkoxylated resin-type phenol resin were deteriorated such as a coating film formed using the alkoxylated resin-type phenol resin not maintaining the initial color or occurring of a blushing phenomenon.

According to another aspect of the present invention, provided is an alkoxylated resol-type phenol resin including a repeating unit represented by Formula 1 and a repeating unit represented by Formula 2 and at least one group represented by Formula 3.

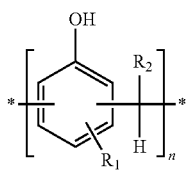

[Formula 1]

In Formula 1, n is an integer of 1 to 10, $R_1$ is hydrogen or a group represented by Formula 3, and $R_2$ is hydrogen or a C1 to C2 alkyl group.

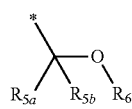

[Formula 3]

In Formula 3, $R_{5a}$ and $R_{5b}$ are each independently hydrogen or a C1 to C2 alkyl group, and $R_6$ is hydrogen or a C1 to C20 alkyl group.

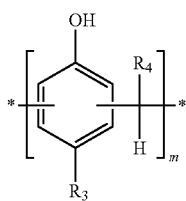

[Formula 2]

In Formula 2, m is an integer of 1 to 10, $R_3$ is a C1 to C8 alkyl group, and $R_4$ is hydrogen or a C1 to C2 alkyl group.

For example, in Formula 2, $R_3$ may be a methyl group, an ethyl group, a tert-butyl group, or a tert-octyl group.

In Formulae 1 to 3, * denotes a binding site to a neighboring atom.

According to an embodiment, the alkoxylated resol-type phenol resin may include at least one repeating unit represented by Formula 1, in which $R_1$ is represented by Formula 3.

As described in relation to the alkoxylated resol-type phenol resin, an alkoxylated resol-type phenol resin including a phenol-derived repeating unit (a repeating unit represented by Formula 1) and a repeating unit having a C1 to C8 alkyl group at para positions (a repeating unit represented by Formula 2) instead of using meta-cresol as a raw material may exhibit excellent corrosion resistance and salt resistance as compared with those of an alkoxylated resol-type phenol resin conventionally prepared by including meta-cresol as a raw material.

The alkoxylated resol-type phenol resin may further include a repeating unit represented by Formula 4 and a repeating unit represented by Formula 5.

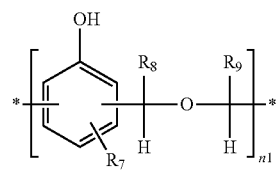

[Formula 4]

In Formula 4, n1 is an integer of 1 to 10, $R_7$ is hydrogen or a group represented by Formula 3, and $R_8$ and $R_9$ are each independently hydrogen or a C1 to C2 alkyl group.

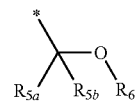

[Formula 3]

In Formula 3, $R_{5a}$ and $R_{5b}$ are each independently hydrogen or a C1 to C2 alkyl group, and $R_6$ is hydrogen or a C1 to C20 alkyl group.

The alkoxylated resol-type phenol resin includes at least one repeating unit represented by Formula 4, in which $R_7$ is represented by Formula 3.

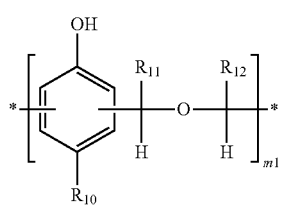

[Formula 5]

In Formula 5, m1 is an integer of 1 to 10, $R_{10}$ is a C1 to C8 alkyl group, $R_{11}$ and $R_{12}$ are hydrogen or a C1 to C2 alkyl group.

The repeating unit represented by Formula 1 and the repeating unit represented by Formula 2 denote repeating units included in the alkoxylated resol-type phenol resin according to the present invention, and may also include a typical resol-type phenol resin structure having ether group in the repeating unit represented by Formula 4 or Formula 5 regardless of the proportion of the presence. This corresponds to the resultant formed by a reaction between alkylol groups which are formed as directly bonded to benzene rings by a reaction between a phenol or para-alkyl phenols, which is a monomer, and an aldehyde compound during the preparation process.

The repeating unit represented by Formula 1 may be a repeating unit represented by one or a combination of at least two selected from Formulae 1-1 to 1-3.

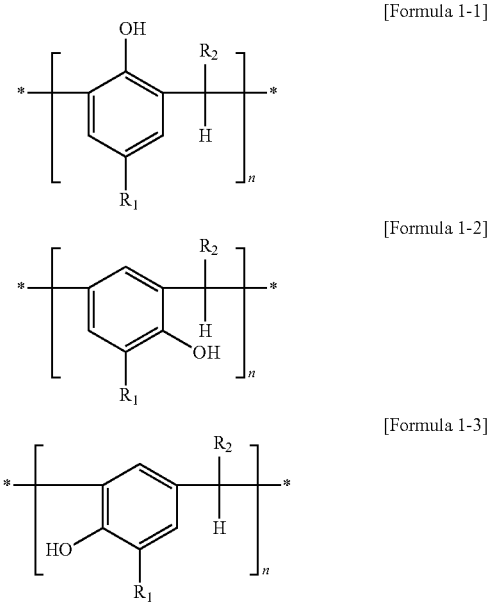

[Formula 1-1]

[Formula 1-2]

[Formula 1-3]

In Formulae 1-1 to 1-3, n is an integer of 1 to 10,
$R_1$ is hydrogen or a group represented by Formula 3, and
$R_2$ is hydrogen or a C1 to C2 alkyl group.

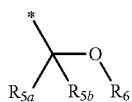

[Formula 3]

In Formula 3, $R_{5a}$ and $R_{5b}$ are each independently hydrogen or a C1 to C2 alkyl group, and
$R_6$ is hydrogen or a C1 to C20 alkyl group.

Also, the repeating unit represented by Formula 2 may be a repeating unit represented by Formula 2-1.

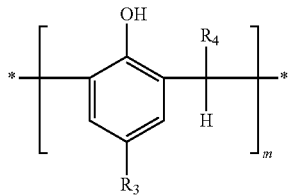

[Formula 2-1]

In Formula 2-1, m is an integer of 1 to 10,
$R_3$ is a C1 to C8 alkyl group, and
$R_4$ is hydrogen or a C1 to C2 alkyl group.

Preferably, in Formula 2-1, $R_3$ may be a methyl group, and in this case, para-cresol is used as a raw material, which is suitable to be used as a varnish for forming a coating film exhibiting the most excellent corrosion resistance and salt resistance, for example, a corrosion resistant varnish. For example, the varnish may be a coating material for coating cans.

Among benzene rings included in the alkoxylated resol-type phenol resin, a ratio of benzene rings to which a C1 to C8 alkyl group are not directly bonded to benzene rings to which a C1 to C8 alkyl group are directly bonded may be in a range of 1:1 to 1:10, for example, 1:2 to 1:6 or 1:2 to 1:5. Here, the proportion of the benzene rings to which a C1 to C8 alkyl group are not directly bonded corresponds to a mole number of the repeating unit represented by Formula 1 or Formula 4, and the proportion of the benzene rings to which a C1 to C8 alkyl group are directly bonded corresponds to a mole number of the repeating unit represented by Formula 2 or Formula 5. The proportions each denote a proportion according to the number of benzene rings. The proportions described above may be proportional to a molar ratio of the phenol and para-alkyl phenols used in the preparation process, and may particularly be analyzed and measured by NMR. The alkoxylated resol-type phenol resin having the proportions within these ranges may not only have excellent corrosion resistance and salt resistance but also a coating film formed of a varnish including the alkoxylated resol-type phenol resin may have excellent adhesion.

The total amount of alkoxy groups in the alkoxylated resol-type phenol resin may be in a range of 50% to 100% of the total amount of alkoxy groups and alkylol groups in the alkoxylated resol-type phenol resin. Here, 100% of the total amount of alkoxy groups and alkylol groups in the alkoxylated resol-type phenol resin denotes complete alkoxylation of a resin-type phenol resin. An amount of alkoxy groups and alkylol groups denotes the number of functional groups existing therein. The alkoxy groups are derived from an alcoholic compounds used for alkoxylation in the step (b) of the preparation method described above. When the total amount of alkoxy groups is less than 50% of the total amount of the alkoxy groups and alkylol groups, a tendency of graft polymerization of the alkoxylated resol-type phenol resin alone increases, and thus there is a problem of a decrease in processability.

According to an embodiment, the total amount of alkoxy groups in the alkoxylated resol-type phenol resin may be 80% to 90% of alkoxy groups and alkylol groups in the alkoxylated resol-type phenol resin, and in this case, compatibility with the main materials of a resin composition including the alkoxylated resol-type phenol resin may be improved, and thus a coating film having excellent corrosion resistance and salt resistance may be formed.

A weight average molecular weight of the alkoxylated resol-type phenol resin may be in a range of 1000 g/mol to 3000 g/mol. For example, a weight average molecular weight of the alkoxylated resol-type phenol resin may be in a range of 1200 g/mol to 2500 g/mol or a range of 1500 g/mol to 2000 g/mol. When the weight average molecular weight of the alkoxylated resol-type phenol resin is within these ranges, the alkoxylated resol-type phenol resin is preferable in terms of having excellent processability, excellent compatibility with the main materials combined for forming of a coating film, and excellent curing property.

According to an embodiment, in Formula 1, $R_2$ is hydrogen; in Formula 2, $R_3$ is a methyl group, and $R_4$ is hydrogen; in Formula 3, $R_{5a}$ and $R_{5b}$ are hydrogen, and $R_6$ is a C3 to C6 alkyl group; in the alkoxylated resol-type phenol resin, a ratio of benzene rings to which a C1 to C8 alkyl group are not directly bonded to benzene rings to which a C1 to C8 alkyl group are directly bonded is in a range of 1:2 to 1:5; and the total amount of alkoxy groups in the alkoxylated resol-type phenol resin may be 50% to 100% of the total amount of alkoxy groups and alkylol groups in the alkoxylated resol-type phenol resin. Detachment of a coating film prepared using a coating material including the alkoxylated resol-type phenol resin satisfying all these conditions on a tape in the Scribe-Grid test performed according to ASTM B 571 was not observed, and thus it was confirmed that the coating film had excellent adhesion. It was confirmed that a part of a coating film prepared using a varnish including an alkoxylated resol-type phenol resin not satisfying the conditions in the same test was observed on a tape. In addition, it was confirmed that when the alkoxylated resol-type phenol resin was applied in a coating film for coating the inner surface of cans, it was confirmed that excellent color characteristics were exhibited such as easy realization of the desired color, maintaining the initial color after a long-term storage of the content, and no blushing phenomenon.

According to another aspect of the present invention, provided is a resin composition including the alkoxylated resol-type phenol resin. The alkoxylated resol-type phenol resin may be used as a curing agent of various resins, and may preferably be used in combination as a curing agent of an epoxy resin or a polyester resin. The resin composition combined as a curing agent of an epoxy resin or a polyester resin may be used as a varnish, for example, a varnish for coating the inner surface of cans, as will be described herein to prepare a coating film having excellent corrosion resistance and salt resistance.

The alkoxylated resol-type phenol resin may be included in an amount of 50 parts to 70 parts by weight based on the total weight of the resin composition. For example, the alkoxylated resol-type phenol resin may be included in an amount of 55 parts to 65 parts by weight based on the total weight of the resin composition.

According to another embodiment of the present invention, provided is a varnish including the resin composition or, for example, a corrosion resistant varnish.

According to an embodiment, a varnish including the resin composition may be used as a varnish for coating the inner surface of cans.

The varnish for coating the inner surface of cans may further include a pigment, a solvent, or an additive.

Examples of the pigment include an inorganic pigment and an organic pigment. The inorganic pigment may be at least one selected from the group consisting of chromates (chrome yellow and chrome vermilion), ferrocyanides (Prussian blue), sulfides (cadmium yellow and cadmium red), oxides (titanium oxide, iron oxide red, iron black, and zinc oxide), sulfates (barium sulfate and lead sulfate), silicates (ultramarine blue and calcium silicate), carbonates (calcium carbonate and magnesium carbonate), phosphates (cobalt violet), metal powders (aluminum powder and bronze), and carbon (carbon black).

The organic pigment may be at least one selected from the group consisting of azo organic pigments (benzidine yellow, Hansa yellow, vulcan orange, permanent red FSR, carmine 6B, lake red C, Cromophtal Red, and Cromophtal Yellow), and phthalocyanine organic pigments (phthalocyanine blue and phthalocyanine green).

Examples of the solvent include aromatic hydrocarbon solvents such as toluene, xylene, Solvesso #100, and Solvesso #150; aliphatic hydrocarbon solvents such as hexane, heptane, octane, and decane; and ester solvents such as methyl acetate, ethyl acetate, isopropyl acetate, butyl acetate, amyl acetate, ethyl formate, and butyl propionate. Other examples of the solvent include the following water-miscible organic solvents: alcohol solvents such as methanol, ethanol, propanol, and butanol; ketone solvents such as acetone, methyl ethyl ketone, and cyclohexanone; and glycol ether solvents such as ethylene glycol (mono, di)methyl ether, ethylene glycol (mono, di)ethyl ether, ethylene glycol monopropyl ether, ethylene glycol monoisopropyl ether, monobutyl ether, diethylene glycol (mono, di)methyl ether, diethylene glycol (mono, di)ethyl ether, diethylene glycol monoisopropyl ether, diethylene glycol monobutyl ether, triethylene glycol (mono, di)methyl ether, propylene glycol (mono, di)methyl ether, propylene glycol monopropyl ether, propylene glycol monobutyl ether, and dipropylene glycol (mono, di)methyl ether.

Examples of the additive include various lubricants, antifoaming agents, leveling agents, and lubricants. Other curing agents that serve as curing aids, such as a melamine resin, a benzoguanamine resin, and an isocyanate resin, may also be used in combination with the above additives.

Hereinafter, the present invention will be described in more detail through the Examples. These Examples are provided only for more specifically describing the present invention, and it will be obvious to a person with ordinary skill in the art to which the present invention pertains that the scope of the present invention is not limited by these Examples.

Example 1. Preparation of Alkoxylated Resol-Type Phenol Resin

To a four-neck flask equipped with a stirrer, a condenser, and a thermometer, 339.92 g (3.14 mol) of p-cresol, 73.96 g (0.79 mol) of phenol, 385 g (11.79 mol) of 92% paraformaldehyde, 388.5 g (5.24 mol) of n-butanol, and 50.27 g of 50% NaOH aqueous solution were added. The resulting mixture was heated to 60° C. and reacted for 3 hours, and then a temperature of the resultant was increased to 80° C. and reacted until a weight average molecular weight was from 1500 g/mol to 1800 g/mol.

After the reaction had been completed, 777 g (10.48 mol) of n-butanol was added to the reaction mixture. After the pH inside the system was controlled to be in a range of 3.5 to 4.0 using formic acid (pKa=3.8), the resulting mixture was reacted at 100° C. to 110° C. for 20 hours while removing water produced in the process of the reaction. After the reaction had been completed, 800 g of ion exchange water was added to the reaction mixture, and the reaction mixture was stirred at 80° C. and subsequently left to stand. The water layer separated at the bottom was removed. To reduce unreacted monomers, the separated water layer was washed with water three times or more. Then, the solvent was removed under the reduced pressure. Thus, an alkoxylated resol-type phenol resin having a solid content of 58% to 62% in n-butanol solution was obtained. The proportion (degree of alkoxylation) of methylol groups included in the alkoxylated resol-type phenol resin which were substituted into butoxy groups was 84%. The weight average molecular weight of the alkoxylated resol-type phenol resin was in a range of 1500 g/mol to 1800 g/mol.

Example 2 Preparation of Alkoxylated Resol-Type Phenol Resin

To a four-neck flask equipped with a stirrer, a condenser, and a thermometer, 297.01 g (2.75 mol) of p-cresol, 110.94 g (1.18 mol) of phenol, 513.37 g (15.72 mol) of 92% paraformaldehyde, 388.5 g (5.24 mol) of n-butanol, and 50.27 g of 50% NaOH aqueous solution were added. The resulting mixture was heated to 60° C. and reacted for 3 hours, and then a temperature of the resultant was increased to 80° C. and reacted until a weight average molecular weight was from 1800 g/mol to 2000 g/mol.

After the reaction had been completed, 777 g (10.48 mol) of n-butanol was added to the reaction mixture. After the pH inside the system was controlled to be in a range of 3.5 to 4.0 using formic acid (pKa=3.8), the resulting mixture was reacted at 100° C. to 110° C. for 25 hours while removing water produced in the process of the reaction. After the reaction had been completed, 800 g of ion exchange water was added to the reaction mixture, and the reaction mixture was stirred at 80° C. and subsequently left to stand. The water layer separated at the bottom was removed. To reduce unreacted monomers, the separated water layer was washed with water three times or more. Then, the solvent was removed under the reduced pressure. Thus, an alkoxylated resol-type phenol resin having a solid content of 58% to 62% in n-butanol solution was obtained. The proportion (degree of alkoxylation) of methylol groups included in the alkoxylated resol-type phenol resin which were substituted into butoxy groups was 75%. The weight average molecular weight of the alkoxylated resol-type phenol resin was in a range of 1800 g/mol to 2000 g/mol.

Example 3 Preparation of Alkoxylated Resol-Type Phenol Resin

To a four-neck flask equipped with a stirrer, a condenser, and a thermometer, 297.01 g (2.75 mol) of p-cresol, 110.94 g (1.18 mol) of phenol, 641.67 g (19.65 mol) of 92% paraformaldehyde, 388.5 g (5.24 mol) of n-butanol, and 25.14 g of 50% NaOH aqueous solution were added. The resulting mixture was heated to 60° C. and reacted for 3 hours, and then a temperature of the resultant was increased to 80° C. and reacted until a weight average molecular weight was from 1800 g/mol to 2000 g/mol.

After the reaction had been completed, 777 g (10.48 mol) of n-butanol was added to the reaction mixture. After the pH inside the system was controlled to be in a range of 3.5 to 4.0 using formic acid (pKa=3.8), the resulting mixture was reacted at 100° C. to 110° C. for 25 hours while removing water produced in the process of the reaction. After the reaction had been completed, 800 g of ion exchange water was added to the reaction mixture, and the reaction mixture was stirred at 80° C. and subsequently left to stand. The water layer separated at the bottom was removed. To reduce unreacted monomers, the separated water layer was washed with water three times or more. Then, the solvent was removed under the reduced pressure, and the solvent was removed. Thus, an alkoxylated resol-type phenol resin having a solid content of 58% to 62% in n-butanol solution was obtained. The proportion (degree of alkoxylation) of methylol groups included in the alkoxylated resol-type phenol resin which were substituted into butoxy groups was 64%. The weight average molecular weight of the alkoxylated resol-type phenol resin was in a range of 1800 g/mol to 2000 g/mol.

Comparative Example 1 Preparation of Alkoxylated Resol-Type Phenol Resin

An alkoxylated resol-type phenol resin was prepared in the same manner as in Example 1, except that 85.43 g (0.79 mol) of m-cresol was used instead of 73.96 g (0.79 mol) of phenol. The proportion (degree of alkoxylation) of methylol groups included in the alkoxylated resol-type phenol resin which were substituted into butoxy groups was 82%. The weight average molecular weight of the alkoxylated resol-type phenol resin was in a range of 1500 g/mol to 1800 g/mol.

Comparative Example 2 Preparation of Alkoxylated Resol-Type Phenol Resin

An alkoxylated resol-type phenol resin was prepared in the same manner as in Example 3, except that 127.60 g (1.18 mol) of m-cresol was used instead of 110.94 g (1.18 mol) of phenol. The proportion (degree of alkoxylation) of methylol groups included in the alkoxylated resol-type phenol resin which were substituted into butoxy groups was 65%. The weight average molecular weight of the alkoxylated resol-type phenol resin was in a range of 1800 g/mol to 2000 g/mol.

A varnish for coating film was prepared using each of the phenol resins prepared in Examples 1 to 3 and Comparative Examples 1 and 2 in the following manner. Each of the vanish was applied to a tin-plated steel sheet, followed by baking treatment. Tests of processability, retort resistance, corrosion resistance, and salt resistance were performed on the coating films. Methods of the tests are shown below.

Experiment Example 1. Evaluation of Coating Film Performance

Varnish for Coating Film

An epoxy resin or a polyester resin, n-butanol, and xylene were dissolved in a mixture solvent in a weight ratio of 0.6:1:1 to prepare an epoxy resin or polyester resin solution having a solid content of 30%. The epoxy resin or polyester resin solution and each phenol resin obtained from Examples 1 to 3 and Comparative Examples 1 and 2 were mixed respectively such that the solid content and the weight ratio of the epoxy resin or polyester resin solution to the phenol resin was 8 to 2 to obtain sample vanish compositions for coating film.

Coating Film Performance Test Method

The sample varnishes prepared by the above methods were each applied to a tin-plated steel sheet having a thickness of 0.3 mm with a bar coater such that a thickness of a dry coating film on the steel sheet was 5 μm to 7 μm, and the resulting coating film was printed at 205° C. for 10 minutes. Thereafter, the following coating film performances were measured, and the results are shown in Table 1.

(1) Processability: After treating each of the samples with steam and high-temperature hydrothermal at 125° C. for 30 minutes, adhesion of the film when the coating film was forcibly peeled off at the side thereof was evaluated according to the following levels. Good (◉), Fair (◯), Poor (Δ)

(2) Retort resistance: After treating each of the samples with steam and high-temperature hydrothermal at 125° C. for 30 minutes, whitening state of the adhesive layer was observed by naked eye and evaluated according to the following levels. Good (◉), Fair (◯), Poor (Δ)

(3) Corrosion resistance: After treating each of the samples with an aqueous copper sulfate solution for 3 hours, the state of the adhesive layer was observed by naked eye and evaluated according to the following levels. Good (◉), Fair (◯), Poor (Δ)

(4) Corrosion resistance, salt resistance: After retort-treating each of the samples in 3% sodium chloride, 3% acetic acid, and 0.1% cysteine aqueous solutions at 125° C. for 30 minutes, the state of the adhesive layer was observed by naked eye and evaluated according to the following levels. Good (⊙), Fair (○), Poor (Δ)

TABLE 1

|  |  | Example 1 | Example 2 | Example 3 | Comparative Example 1 | Comparative Example 2 |
|---|---|---|---|---|---|---|
| Processability | Steam | ⊙ | ⊙ | ⊙ | ⊙ | ⊙ |
|  | High-temperature hydrothermal | ⊙ | ⊙ | ○ | ○ | ○ |
| Retort resistance | Steam | ⊙ | ⊙ | ⊙ | ⊙ | ⊙ |
|  | High-temperature hydrothermal | ⊙ | ⊙ | ⊙ | ⊙ | ⊙ |
| Corrosion resistance | Copper sulfate | ⊙ | ○ | ⊙ | ⊙ | Δ |
| Corrosion resistance, salt resistance | 3% Sodium chloride | ⊙ | ⊙ | Δ | ○ | Δ |
|  | 3% Acetic acid | ○ | ⊙ | ⊙ | Δ | ○ |
|  | 0.1% Cysteine | ⊙ | ○ | ○ | Δ | ○ |

As shown in Table 1, when compared with those of Comparative Examples 1 and 2, it was confirmed that the coating films using the alkoxylated resol-type phenol resin prepared in Examples 1 to 3 exhibited equal or excellent levels of overall properties such as processability, retort resistance, corrosion resistance, and salt resistance.

From this result, it was confirmed that properties of a coating film may be improved by using phenol as a raw material instead of meta-cresol in the preparation of an alkoxylated resol-type phenol resin.

Therefore, the method of preparing an alkoxylated resol-type phenol resin according to the present invention enables preparation of an alkoxylated resol-type phenol resin, which is a curing agent with which a coating film having excellent corrosion resistance, salt resistance, and color characteristics may be formed.

The above-described Examples and Comparative Examples are set forth herein for illustrating the present invention, and the present invention is not limited thereto. Those skilled in the art will appreciate that various modifications are possible, without departing from the spirit of the present invention. Therefore, the scope of the present invention should be defined by the appended claims.

The invention claimed is:

1. An alkoxylated resol-type phenol resin comprising a repeating unit represented by Formula 1 and a repeating unit represented by Formula 2 and comprising at least one group represented by Formula 3, wherein the repeating unit represented by Formula 1 and the repeating unit represented by Formula 2 are comprised in the alkoxylated resol-type phenol resin at a ratio in range of about 1:1 to about 1:10:

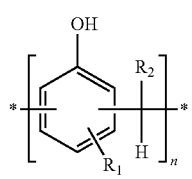

[Formula 1]

wherein, in Formula 1, n is an integer selected from 1 to 10,
$R_1$ is hydrogen or a group represented by Formula 3, and
$R_2$ is hydrogen or a C1 to C2 alkyl group,

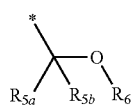

[Formula 3]

wherein, in Formula 3, $R_{5a}$ and $R_{5b}$ are each independently hydrogen or a C1 to C2 alkyl group, and
$R_6$ is hydrogen or a C1 to C20 alkyl group,

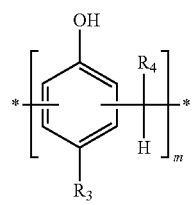

[Formula 2]

wherein, in Formula 2, m is an integer selected from 1 to 10,
$R_3$ is a C1 to C8 alkyl group, and
$R_4$ is hydrogen or a C1 to C2 alkyl group.

2. The alkoxylated resol-type phenol resin of claim 1, wherein $R_3$ in Formula 2 is a methyl group, an ethyl group, a tert-butyl group, or a tert-octyl group.

3. The alkoxylated resol-type phenol resin of claim 1, wherein the total amount of an alkoxy group comprised in the alkoxylated resol-type phenol resin is about 50% to about 100% of the total amount of an alkoxy group and an alkylol group comprised in the alkoxylated resol-type phenol resin.

4. The alkoxylated resol-type phenol resin of claim 1, wherein,
in Formula 1, $R_2$ is hydrogen,
in Formula 2, $R_3$ is a methyl group, and $R_4$ is hydrogen,
in Formula 3, $R_{5}a$ and $R_{5}b$ are hydrogen, and $R_6$ is a C3 to C6 alkyl group,
among benzene rings comprised in the alkoxylated resol-type phenol resin, a ratio of benzene rings not directly bonded to a C1 to C8 alkyl group to benzene rings directly bonded to a C1 to C8 alkyl group is in a range of about 1:2 to about 1:5, and the total amount of an alkoxy group comprised in the alkoxylated resol-type phenol resin is about 50% to about 100% of the total amount of an alkoxy group and an alkylol group comprised in the alkoxylated resol-type phenol resin.

5. A resin composition comprising the alkoxylated resol-type phenol resin of claim 1.

6. A varnish comprising the resin composition of claim 5.

* * * * *